Figure 1:
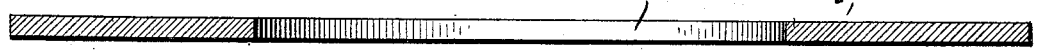

No. 880,831. PATENTED MAR. 3, 1908.
F. N. SMITH.
CLAMPING RING FOR PIPE COUPLINGS.
APPLICATION FILED DEC. 10, 1906.

2 SHEETS—SHEET 1.

WITNESSES: INVENTOR
W. F. Doyle. Frank N. Smith
J. K. Moore BY
Whitaker Prevost, Attorneys No. 880,831. PATENTED MAR. 3, 1908.
F. N. SMITH.
CLAMPING RING FOR PIPE COUPLINGS.
APPLICATION FILED DEC. 10, 1906.

2 SHEETS—SHEET 2.

WITNESSES:
INVENTOR
Frank N. Smith
BY
Attorney

UNITED STATES PATENT OFFICE.

FRANK N. SMITH, OF BRADFORD, PENNSYLVANIA, ASSIGNOR TO S. R. DRESSER MANUFACTURING COMPANY, OF BRADFORD, PENNSYLVANIA.

CLAMPING-RING FOR PIPE-COUPLINGS.

No. 880,831.  Specification of Letters Patent.  Patented March 3, 1908.

Application filed December 10, 1906. Serial No. 347,167.

*To all whom it may concern:*

Be it known that I, FRANK N. SMITH, citizen of the United States, residing at Bradford, in the county of McKean and State of Pennsylvania, have invented certain new and useful Improvements in Clamping-Rings for Pipe-Couplings; and I do hereby declare the following to be a full, clear, and exact description of the invention, such as will enable others skilled in the art to which it appertains to make and use the same.

My invention consists in the novel features hereinafter pointed out, reference being had to the accompanying drawings which illustrate one form in which I have contemplated embodying my invention and several slight modifications thereof and said invention is fully disclosed in the following description and claims.

The object of my invention is to provide a clamping ring of wrought metal, preferably wrought iron or steel, for pipe couplings, and particularly for that class of pipe couplings in which compressible packing of rubber or other suitable material is employed, which is made of very light or thin material throughout and is reinforced to provide the desired strength and also has its packing engaging portion thickened by upsetting the same, in any desired manner, to provide a packing engaging face of substantially the width of the packing and of considerably greater thickness than other portions of the clamping ring.

In the drawings I have for greater clearness, illustrated a blank from which the said clamping ring may be made and the various steps in its production, as well as certain modifications in which the additional thickness of the packing engaging flange is distributed on the inner side, the outer side or on both sides thereof.

Figure 2:
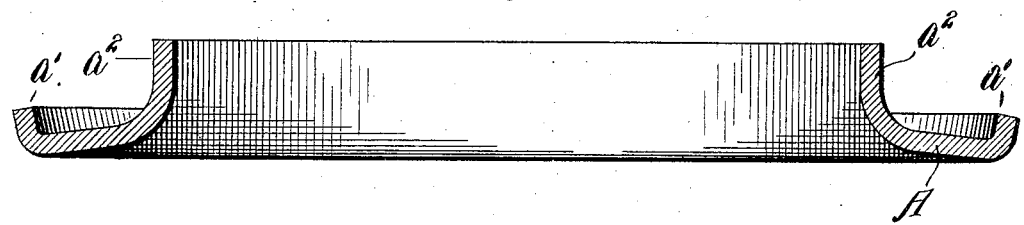
Figure 3:
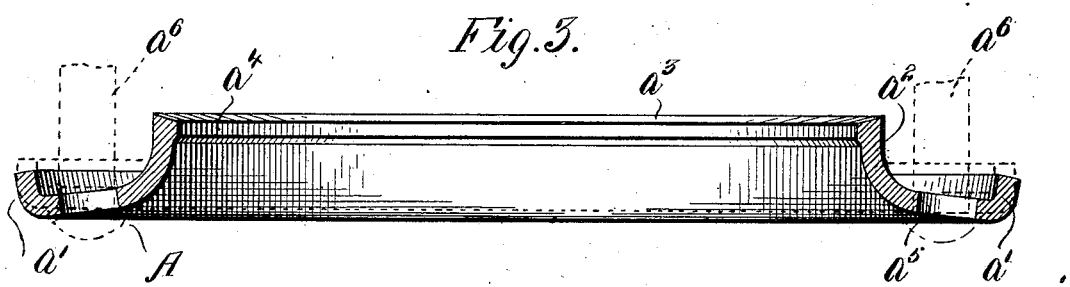
Figure 4:
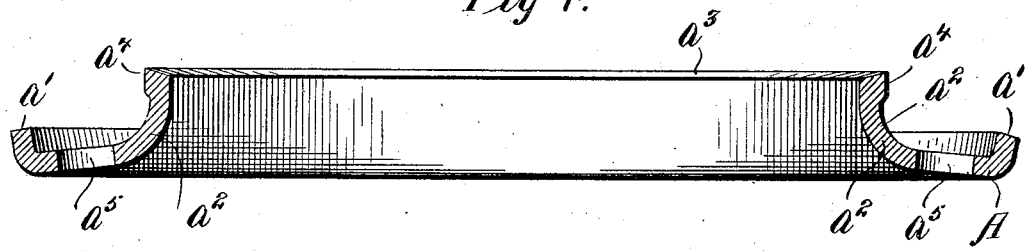
Figure 5:
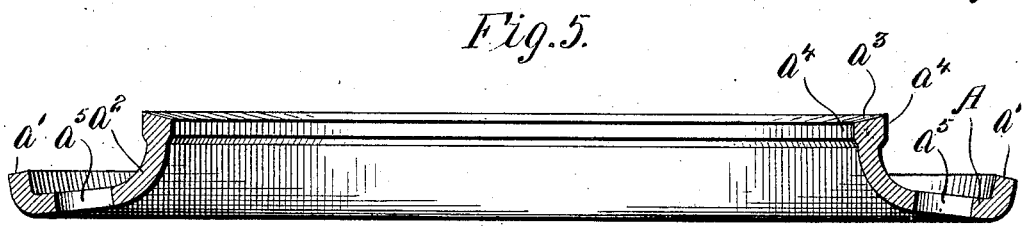
Figure 6:
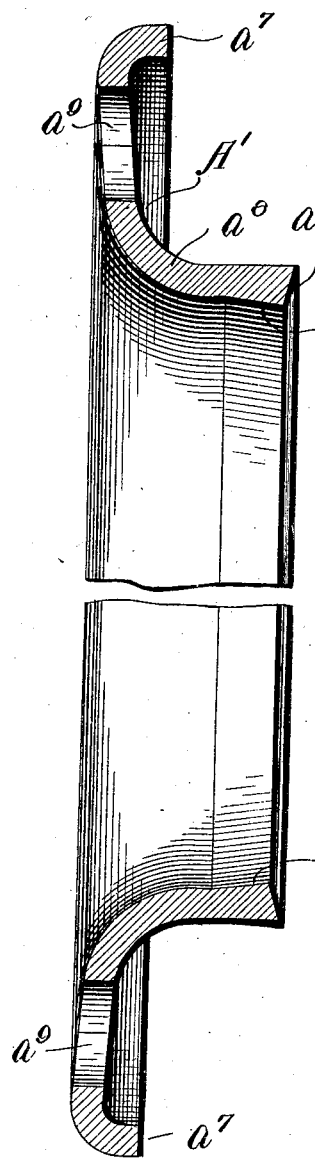
Figure 7:
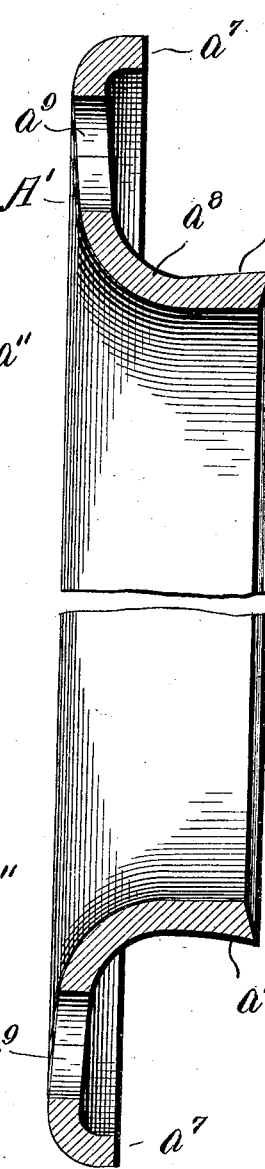
Figure 8:
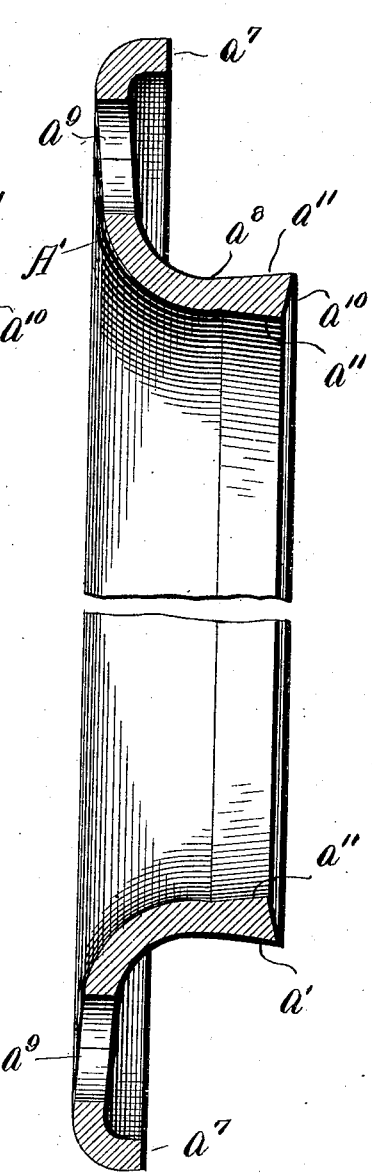

In said drawings, Figure 1 is a sectional view of a blank from which my improved clamping ring may be conveniently made. Fig. 2 is a sectional view of the blank after it has been partially formed. Fig. 3 is a similar view of the completed clamping ring or flange. Figs. 4 and 5 are similar views showing slight modifications of the ring. Figs. 6, 7 and 8 are sectional views drawn to a slightly larger scale, and partly broken away, showing other slight modifications of my improved clamping ring.

In the drawings, A, Fig. 1, represents a blank from which my improved flange may conveniently be made, which blank is composed preferably of sheet metal, wrought iron or steel, and is in the form of a flat ring or in other words, a circular plate having a central circular aperture $a$. My improved clamping ring may, however, be formed from a different blank and in a different manner from that herein described if found convenient or desirable.

In the treatment of the blank A, it may be operated upon while hot or cold, and by rolling or forging or by the use of dies as preferred. The blank is first operated upon so as to bend its outer edge substantially or nearly perpendicularly to the plane of the flat annular main body to form a reinforcing flange $a'$, as shown in Fig. 2 and the inner edge of the blank is bent on the same side as said reinforcing flange to form a packing engaging flange or follower portion $a^2$. The main body of the ring between said flanges $a'$ and $a^2$ is also bent so that it is inclined to the axis of the clamping ring. Supposing the ring to be supported in a horizontal position as shown in Fig. 2, the said main portion inclines downwardly and outwardly from the base of the flange $a^2$ as clearly shown.

The blank so formed, and as shown in Fig. 2, is then operated upon so as to upset the outer edge of the flange $a^2$, so as to increase its thickness considerably and produce an annular face $a^3$, (see Fig. 3) which I term the packing engaging face, of greater width than the thickness of the flange $a'$ and main body A, as clearly shown in that figure. I prefer to upset the outer edge of the flange $a^2$ in such manner as to form a lip $a^4$ on either one or both the lateral faces of the flange $a^2$ although this is not essential. Thus in Fig. 3 the flange $a^2$ is shown provided with a lip $a^4$ on the inner face; in Fig. 4 the flange $a^2$ is shown with the lip $a^4$ on the outer face, and in Fig. 5 the flange $a^2$ is shown with the metal distributed so as to form lips $a^4$ $a^4$, one of which is on the inner and the other on the outer face of said flange $a^2$. The main body A of the flange is also provided at suitable intervals with bolt holes $a^5$, for the reception of clamping or coupling bolts $a^6$ $a^6$ which are indicated in Fig. 3. When the bolts $a^6$ $a^6$ are tightened up so as to exert great pressure upon the clamping ring, as is the case when the ring is used in a pipe coupling the main body A which has a certain amount of elasticity is drawn into a position substantially perpendicular to the axis of the ring as indicated in dotted lines Fig. 3, thus compressing the packing of the coupling (not shown) with a yielding pressure, and enabling the flange to be made very light and at the same time to have sufficient strength to answer the purpose for which it is intended without breaking or buckling and also preventing to a large extent the danger of stripping the threads of the bolts when they are tightened up.

In Figs. 6, 7 and 8 I have illustrated other modifications of my improved clamping ring. Thus in Fig. 6, the main body A' is of substantially the same shape as the corresponding portions of the ring A, and is provided with the exterior reinforcing flange $a^7$ at its outer edge, the inner packing engaging flange $a^8$ and bolt holes $a^9$ all constructed as hereinbefore described.

The outer edge portion of the flange $a^8$ is upset in any desired manner, to provide the packing engaging face $a^{10}$ of greater width than the thickness of the main body A', but in this form of my invention the metal is upset so as to increase in thickness gradually from a line a short distance back from the outer edge of said flange $a^8$, to the outer edge or face $a^{10}$.

In Fig. 6, the increase in thickness is all disposed on the inner face of flange $a^8$ producing an inclined face $a^{11}$ as shown.

In Fig. 7 a clamping ring is shown which is substantially identical with the ring shown in Fig. 6, except that the increase in the thickness of flange $a^8$ at its outer edge is disposed entirely on the outer face as shown at $a^{11}$ and in Fig. 8 a similar flange is illustrated in which the increased thickness is disposed substantially equally on the inner and outer faces of the flange $a^8$ as shown at $a^{11}$, $a^{11}$.

In all of the flanges shown in Figs. 6, 7 and 8 no "lip" such as is shown in Figs. 3, 4 and 5 is produced, since the flange $a^8$ is gradually increased in thickness as before described.

What I claim and desire to secure by Letters Patent is:

1. A clamping ring for pipe couplings having an annular main body, provided with bolt holes and having at its inner edge a packing engaging flange extending on one side of said main body, said main body being inclined to the axis of the clamping ring from the inner edge of said annular main body in a direction away from said flange, and having a certain amount of elasticity, whereby the yielding of said main body under pressure of the bolts will tend to draw it into a position perpendicular to the axis of said main body, substantially as described.

2. A wrought metal clamping ring for pipe couplings comprising an annular main body provided with bolt holes and having at its inner edge, an annular packing engaging flange extending on one side of said main body, said main body having a certain amount of elasticity and being capable of yielding under the strain of the bolts, substantially as described.

3. A wrought metal clamping ring for pipe couplings comprising an annular main body disposed at an angle to the axis of the ring, and provided with bolt holes, and having at its inner edge an annular packing engaging flange, said main body having a certain amount of elasticity, the said flange being thickened at its outer edge to provide a packing engaging face of greater width than the normal thickness of said flange and main body, substantially as described.

4. A wrought metal clamping ring for pipe couplings comprising an annular main body disposed at an angle to the axis of the ring, and provided with bolt holes, and having at its inner edge an annular packing engaging flange, said main body having a certain amount of elasticity the said flange being upset adjacent to its outer edge, to provide a packing engaging face of greater width than the normal thickness of said flange and main body, substantially as described.

5. A wrought metal clamping ring for pipe couplings comprising an annular main body having a certain amount of elasticity and disposed at an angle to the axis of the ring, and provided with bolt holes, and having at its inner edge an annular packing engaging flange, the said flange being upset adjacent to its outer edge to provide a packing engaging face of greater width than the normal thickness of said flange and main body, said additional thickness extending on one side of said flange, substantially as described.

6. A clamping ring for pipe couplings formed of wrought sheet metal, and comprising an annular main body provided at intervals with bolt holes, having its outer edge bent on one side to form a reinforcing flange, and its inner marginal portions bent on the same side as the reinforcing flange to form a packing engaging flange, the outer end of said flange being upset, to increase the width of the outer edge, said main body extending from said packing engaging flange in an inclined position outwardly and away from the said flange, and having a certain amount of elasticity, whereby the strain of the bolts will tend to draw said main body toward a position perpendicular to the axis of said clamping ring, substantially as described.

In testimony whereof I affix my signature in the presence of two witnesses.

FRANK N. SMITH.

Witnesses:
F. P. SCHOONMAKER,
LEONA G. ANDREWS.